United States Patent
Ross

[15] 3,682,546
[45] Aug. 8, 1972

[54] FICHE CAMERA ARRANGEMENT
[72] Inventor: Dan C. Ross, Bethesda, Md.
[73] Assignee: U.S. Dynamics Inc., Elmsford, N.Y.
[22] Filed: April 23, 1971
[21] Appl. No.: 136,794

[52] U.S. Cl. ................................. 355/40, 355/54
[51] Int. Cl. ............................................. G03l 27/52
[58] Field of Search ............................... 355/40, 54

[56] References Cited
UNITED STATES PATENTS

| | | | |
|---|---|---|---|
| 2,296,655 | 9/1942 | Stuart | 355/54 X |
| 3,117,491 | 1/1964 | Stern | 355/40 UX |
| 3,259,037 | 7/1966 | Wilkinson, Jr. | 355/40 X |
| 3,334,539 | 8/1967 | Kleist et al. | 355/40 |
| 3,572,925 | 3/1971 | Ables et al. | 355/54 |

Primary Examiner—Samuel S. Matthews
Assistant Examiner—E. M. Bero
Attorney—Ralph L. Thomas and Thomas & Thomas

[57] ABSTRACT

A fiche camera is described for exposing frames of a film strip which subsequently is converted to a matrix array of photographic frames on a fiche, and the camera includes a transport mechanism for advancing the film, a shutter for exposing the photographic frames of the film strip, and fiche coordinate counting means which is operated each time the shutter is operated. The fiche coordinate counting means includes a first counter which counts the frames in each column of a fiche, a second counting means responsive to the first counting means for counting the columns in a fiche, and a third counting means responsive to the second counting means which counts the number of fiches in a reel of film in a cartridge.

5 Claims, 5 Drawing Figures

FICHE CAMERA ARRANGEMENT

CROSS-REFERENCES TO RELATED APPLICATIONS

Application Serial No. 137,270 filed on Apr. 26, 1971 for Method Of Making A Matrix Of Photographs From A Film Strip by Julian Silver.

Application Serial No. 137,215 filed on Apr. 26, 1971 for Fiche Camera Device by John E. Blackert.

BACKGROUND OF THE INVENTION

2. This invention relates to camera devices, and more particularly to cameras used to make fiches.

2. A microfiche deck is considered superior to microfilm reels in a steadily growing number of applications because the convenience in handling and copying a microfiche is much greater that of microfilm on a reel. The accessability of photographic information on a microfiche also is more rapid than photographic information on reels. In this connection it is pointed out that an operator readily may obtain information widely distributed throughout a number of microfiches, but the retrieval rate is slowed considerably when information must be obtained from frames widely distributed throughout a number of different reels. One type of fiche camera presently available uses relatively wide film which is several inches in width. A plurality of microphotographs are disposed adjacent to one another across the width of the wide film. The camera is expensive because a complex arrangement is required to provide relative movement between the lens and film. The frames are exposed sequentially across the width of the wide film as successive photographs are made. When one row of photographs is made, the film is advanced one frame along the longitudinal axis of the wide film strip, and the process is repeated to expose a plurality of photographs on a second row across the width of the wide film. This process is repeated until all rows of the wide film are exposed, and the wide film then is developed. The developed film may be cut into longitudinal segments of a given length, and each such segment constitutes a card of fiche. The intricate mechanisms of this complex camera require the services of a specially trained operator. This special camera is very expensive to manufacture because it is complex, and it is expensive to operate because a highly skilled operator is required. Consequently, the cost of each resulting fiche is so expensive that its use has not been widespread.

A less sophisticated arrangement presently available for providing a microfiche involves the use of a camera which exposes frames on a film strip of conventional width e.g., 16 millimeter width. The frames on the reel of film are exposed, and after being developed, the film is cut into strips which are placed side by side to form a fiche after which a fiche copy is made on suitable transparent material sufficiently sturdy for filing purposes. However, as exposures are made the camera indicates to the operator the location of the current frame as it will appear on the developed reel of microfilm and not on its location in the resulting fiche. A certain complexity arises in the record keeping required to keep track of the frame number on the reel of strip film as each document is recorded. With this record the location of the document on the ultimate fiche can be determined, but the technique is cumbersome at best. If the reel of developed film is cut into segments and the sequential order of the segments side by side is not maintained, utter confusion results. This is particularly so when there are no identifying visual marks on the individual strips of film to indicate their proper column order. Moreover, the microphotographs are too small to be identified by the naked eye. It is highly desirable, therefore, to avoid the problem of identifying the location of frames on a reel of film by frame number, termed film strip coordinates, and converting subsequently the identity of each frame to fiche number, column number, and row number which are termed fiche coordinates. It is to the elimination of this problem that the present invention is directed.

SUMMARY OF THE INVENTION

It is a feature of this invention to provide a fiche camera which is inexpensive to manufacture, simple to operate, and inexpensive to maintain.

It is a feature of this invention to provide a camera arrangement which indicates to the operator the location of a frame on a film strip in terms of fiche coordinates rather than film strip coordinates.

It is a feature of this invention to provide a fiche camera which uses film strip, and the camera indicates the location of the document in terms of fiche coordinates which may be recorded on the original document by the operator before exposure.

It is another feature of this invention to provide a fiche camera which signifies the fiche coordinates of the documents to the operator when the documents are being exposed, and a space on the film strip is skipped periodically to facilitate the fiche-making process after the film strip is developed.

It is still a further feature of this invention to provide a fiche camera which exposes photographic frames on a film strip and which skips a frame, preferably without exposure, each time a given number of frames on the film strip are exposed thereby to facilitate the fiche-making process after the film strip is developed.

In one arrangement according to this invention a fiche camera is provided which uses strip film of a standard width. The camera includes a latch, film transport, and shutter. The camera further includes a programmer which is connected to the latch, film transport, and the shutter. The programmer includes a set of fiche coordinate counters. A first counter counts the number of frames in a fiche column of K frames, and a second counter responsive to the first counter counts the number of columns in a fiche of L columns. A third counter responsive to the second counter counts the number of fiches per reel of film of M fiches. A record mechanism is provided which is manipulated by an operator to operate the camera. The record mechanism is connected to the first counter, the shutter, and the film transport. Each time the record mechanism is operated, it actuates the first counter, the shutter, and the film transport. A control device is connected between the first counter and the film transport. After the first counter counts K frames, it operates the second counter and the film transport. The film transport is operated to skip one frame, preferably without exposure, to facilitate the fiche-making process after the film is developed. When the film strip is subsequently cut into strips, the cutting operation takes place through the skipped frame. The skipped frame provides greater tolerance for the cutting operation and thereby insures that the cutting operation can take place without damaging a frame on which photographic information is recorded. The skipping operation initiated by the first counter takes place after the last frame in a column is exposed. After the second counter counts L columns, it operates the third counter. The count registered by the first, second, and third counters is visually displayed on the face of the camera thereby to permit an operator to note the fiche coordinates on each document during the recording process. The second and third counters display the respective column number and fiche number presently being exposed. The frame counter preferably displays the number of the frame to be exposed when the record mechanism next is operated. The task of the operator is simplified to the point that he merely writes on the original document the displayed frame number, column number, and fiche number during the photographing process.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
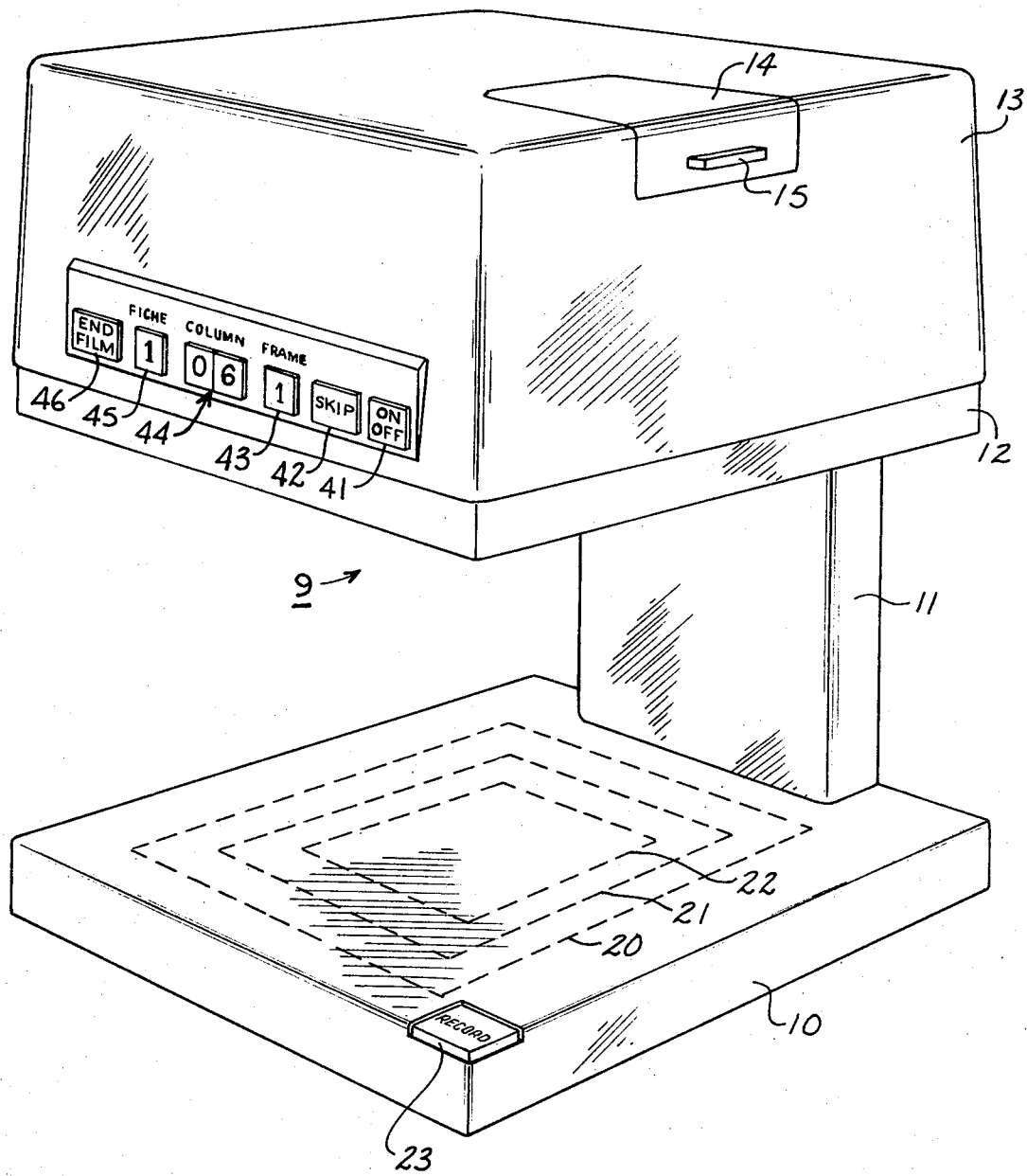
FIG. 1 is a perspective view of a camera according to this invention.

Reference is made to FIG. 1 which illustrates an improved camera according to this invention. The camera 9 includes a base 10 with an upright member 11 which supports a camera housing 12. A cover 13 is disposed on the housing 12, and a door 14 is provided with a handle 15. The door 14 is opened to insert a cartridge of film which preferably is 8 millimeter film 50 feet in length. Documents to be photographed are disposed on the base 10 and aligned with the index markers 20 through 22 which define rectangles useful in centering the documents to lie in the center of the photographic frame when exposed. A record switch 23 is depressed to operate a shutter and photographically record documents on photographic frames of the reel of film. The camera is provided with controls 41 through 46. The on-off switch 41 is operated to supply power to the camera 9. Skip switch 42 is operated to advance the film. It is preferable to advance the film in these instances without making an exposure. A frame counter 43 indicates the next frame to be exposed. The two stage column counter 44 indicates the number of the column being exposed, and the fiche counter 45 indicates the number of the fiche being exposed. Whenever the last fiche is exposed, the end film light 46 is illuminated, and the operator replaces the cartridge with another.

The reel of film is removed, developed, and converted into a plurality of fiches. There are several ways to convert the developed film to fiches and a preferred method is illustrated in FIG. 2.

Figure 2:
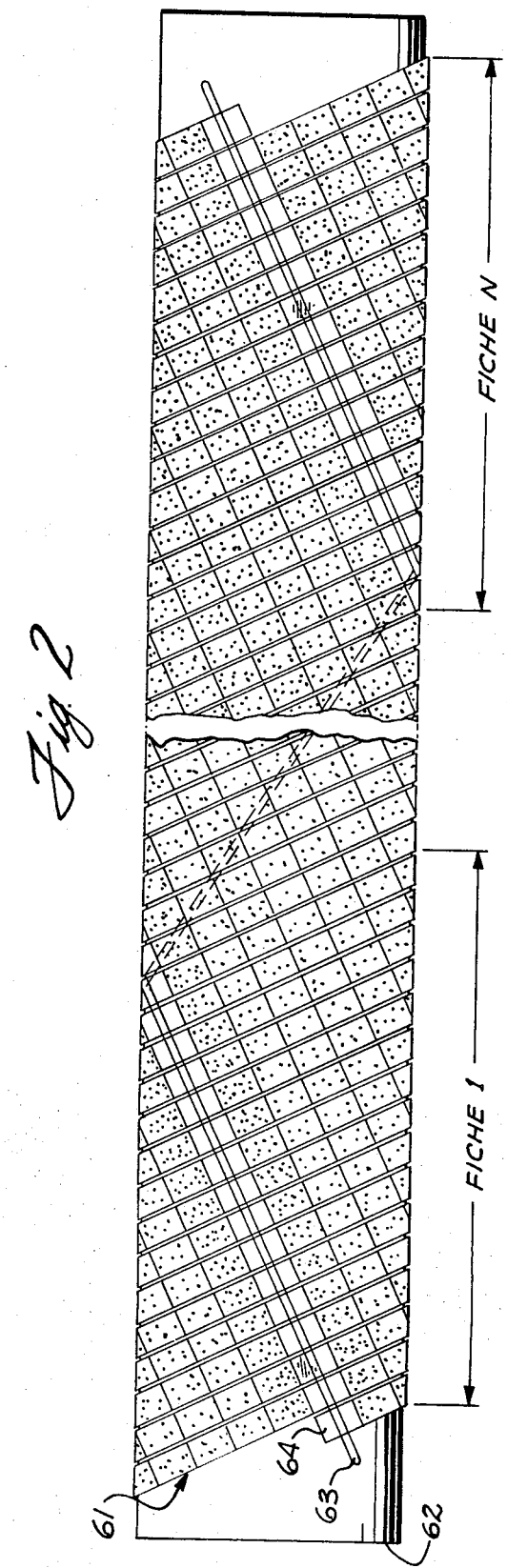
FIG. 2 is a plan view of a cylinder with a roll of film wrapped thereon for fiche-making purposes.

Referring next to FIG. 2, the developed film 61 is wound on a cylinder 62, and successive convolutions of the film are disposed on the drum as shown. The edges of the strip film form a right helix on the drum 62. A slot 63 is disposed on the surface of the drum, and this slot defines a left helix on the surface of the drum. The left helix and the right helix intersect orthogonally. At given intervals during the exposure process frames are skipped without exposure, and the frames thus skipped are blank or transparent after they are developed. The film strip 61 in FIG. 2 is wound in a manner to cause the transparent frames of each convolution to lie over the slot 63 as illustrated. The frame 64 is the first one of the blank frames, and it is disposed over the slot 63 in alignment with the remaining blank frames which define a helical path centered over the slot 63. A transparent adhesive tape, not shown, is placed over the blank frames throughout the distance of the slot 63, and a blade is inserted in the slot 63 and forced along this slot to cut through the transparent tape and blank frames. The result is a large matrix composed of a plurality of columns of photographic frames with the columns disposed side by side and taped together on each end. The large matrix is composed of a plurality of fiches. This large matrix is cut into individual fiches. Transparent photographic copies of the fiches are made on a sturdy transparent plastic card, and the fiche copy is suitable for filing purposes.

Figure 3:
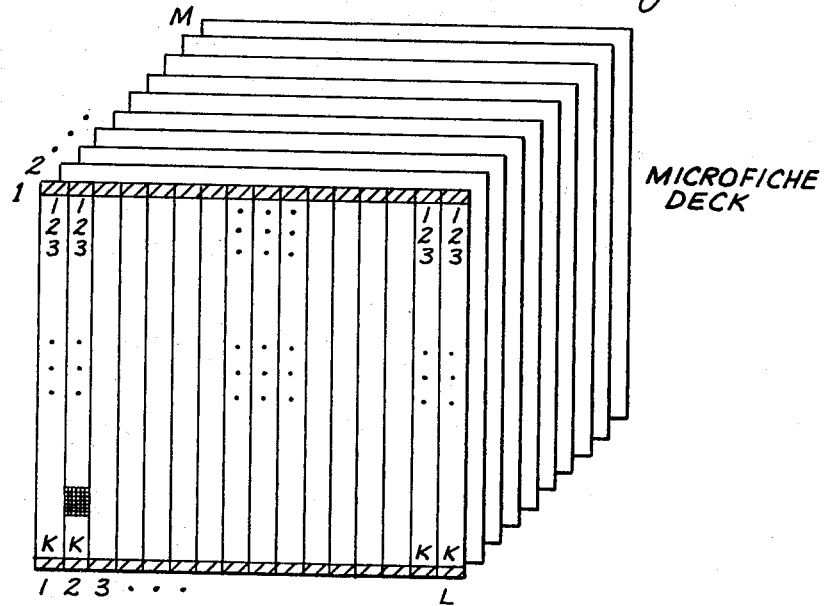
FIG. 3 is a perspective view of microfiche deck.

A microfiche deck is shown in FIG. 3 This deck includes a plurality of cards 1,2, ... M where M may be any positive integer. Each card in the deck has a matrix array of photographic frames disposed in columns and rows. The frames in each column are numbered 1,2,3, . . . K, where K is any integer. The columns in each card are numbered 1,2,3, ... L where L is any integer. The microfiche deck is a three dimensional photographic storage array, and the location of frames is defined in terms of microfiche coordinates of card number, column number and row number.

Figure 4:
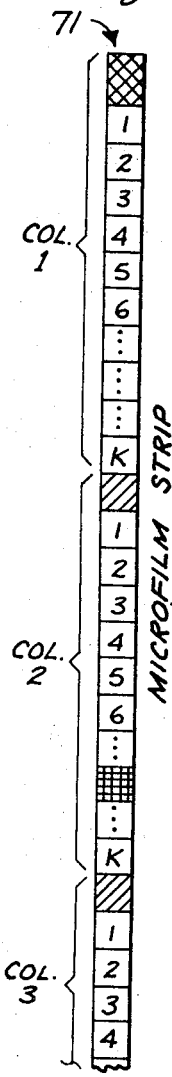
FIG. 4 illustrates a film strip in terms of fiche coordinates according to this invention.

The frames of the microfilm strip 71 in FIG. 4 are numbered in microfiche coordinates the same manner as those in FIG. 3 to illustrate the manner in which the record is made on the strip film 71 for conversion into cards of the microfiche deck in FIG. 3. Column 1 in FIG. 4 of the film strip 71 becomes column 1 of card 1 in FIG. 3. In like fashion the frames identified as columns 2 and 3 on the film strip 71 in FIG. 4 become respective columns 2 and 3 of card 1 of the microfiche deck in FIG. 3. When L rows of frames on the strip film 71 are exposed, microfiche 1 is completed, and the process is repeated to expose microfiches 2,3,4, ... M. In a preferred arrangement the microfiche deck has the parameters, $K = 10$, $L = 16$, and $M = 10$.

Figure 5:
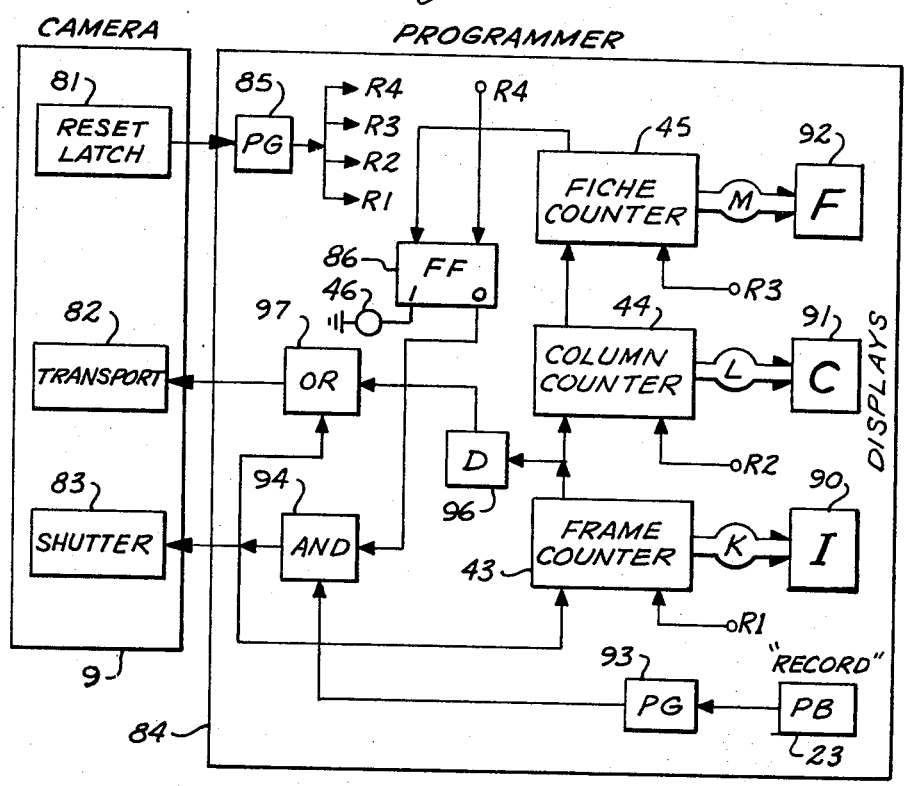
FIG. 5 illustrates schematically a camera and programmer according to this invention.

Reference is made next to FIG. 5 for a description of the basic equipment incorporated in the camera 9 of FIG. 1. The camera 9 in FIG. 1 is illustrated schematically in FIG. 5 in the interest of simplicity. The camera 9 includes a latch 81 which is operated by a switch, not shown, to reset the programmer, a transport mechanism 82 which moves the film after each exposure, and a shutter 83 which exposes each frame.

The camera 9 is connected to a programmer 84. The programmer 84 includes a pulse generator 85 which has output lines R1 through R4. The pulse generator 85 is operated by the latch 81 to reset the programmer 84. The output lines R1 through R3 are connected to the reset input of respective counters R1 through R3. The output line R4 is connected to the reset input of a flip-flop 86. The counters 43 through 45 are connected to respective display devices 90 through 92 which visually present the count registered by the associated counters. The registered count may be displayed as numbers, letters, or a combination of both although only numbers are illustrated. The record switch 23 is a pushbutton switch which is depressed each time the camera is operated. The pushbutton switch is connected to a pulse generator 93 which in turn is connected to an And circuit 94. The output of the And circuit is connected to the shutter 83 and the frame counter 43. The shutter 83 and the frame counter 43 are operated each time the And circuit 94 is operated. The frame counter 43 has an output connected to the column counter 44, and this output is connected also to a delay circuit 96. The output of the delay circuit 96 is connected through an Or circuit 97 to the transport mechanism 82. Each time the frame counter 43 operates the column counter 44, the output signal from the frame counter 43 is delayed by the delay circuit 96 and supplied through the Or circuit 97 to operate the transport mechanism 82 thereby to advance the film by one frame. The column counter 44 has an output connected to the fiche counter 45. The column counter 44 provides an output signal which operates the fiche counter 45 each time the last column L in a fiche is exposed. The fiche counter 45 provides an output signal to the 1 or set input of the flip-flop 86. The output signal from the fiche counter operates the flip-flop 86 whenever the last frame of fiche M is exposed. The display devices 91 and 92 always indicate the current column and fiche being exposed. The display device 90 preferably indicates the identity of the frame behind the shutter before this frame is exposed. However, it may be used to indicate the last frame exposed if this is desired. On the display devices 90 through 92 in FIG. 5 the letters I, C, and F are employed to represent the fiche coordinates of each frame. The display device 90 displays the current frame number I within the current column C ($I \epsilon [1,2,\ldots,K]$), and the display device 91 displays the current column number C within the current fiche F ($C \epsilon [1,2,\ldots,L]$). The display device 92 displays the current fiche number F within the current cartridge ($F \epsilon [1,2,\ldots,M]$).

Next the operation of the camera arrangement in FIG. 5 is discussed. First the door 14 in FIG. 1 is opened and a cartridge is inserted. A cartridge of 8 millimeter film 50 feet in length preferably is employed. Next the on-off switch 41 is actuated to provide power to the camera 9. The latch 81 in FIG. 5 is operated by a switch device, not shown, and the latch 81 provides an output signal which operates the pulse generator 85. The pulse generator 85 in turn provides an output signal on the lines R1 through R4, and this output signal resets respective counters 43 through 45 and the flip-flop 86. Each of these counters is returned to a home or index position. It is assumed for purposes of this discussion that the parameters of the microfiche deck in FIG. 3 are $K = 10$, $L = 16$, and $M = 10$. Therefore, the counter 43 in FIG. 5 registers the value of 1 in the home position, and the display device 90 visually displays the value of 1 as shown in FIG. 1. The column counter 44 in FIG. 5, preferably a two stage counter, registers the value of 01 in the home position, and the display device 91 visually displays the value 01 as shown in FIG. 1. The fiche counter 45 in FIG. 5 registers the value of 1 in the home position, and the display device 92 visually displays the value of 1 as illustrated in FIG. 1. When the flip-flop 86 in FIG. 5 is reset to the 0 state, the output signal from the 0 side of this flip-flop conditions one input to the And circuit 94. The camera equipment in FIG. 5 then is ready to commence recording operations.

A document to be recorded is placed on the top of the base 10 in FIG. 1, and it is positioned with reference to the indicia markings 20 through 22 whereby the document is centered in the frame of the film strip when exposed. An exposure is made by depressing the record switch 23 in FIG. 1. When the record switch 23 is depressed, it operates the pulse generator 93 in FIG. 5. The pulse generator 93 in turn provides an output signal which operates the And circuit 94. Since both inputs to the And circuit 94 then are energized, the And circuit 94 provides an output signal which operates the shutter 83 to make an exposure. The output signal from the And circuit 94 also operates the frame counter 43 thereby to advance it one integer. The frame counter 43 in FIG. 5 then registers the value of 2 which is visually displayed on the face of the camera 9 in FIG. 1. It is pointed out that the presentation on the display devices 90 through 92 in FIG. 5 are visible on the face of the camera 9 in FIG. 1 under the windows labelled respectively frame, column, and fiche. This visual presentation permits the operator to record on the original document the fiche number, the column number, and the frame number. The And circuit 94 also supplies its output signal through the Or circuit 97 to the film transport 82. The film transport 82 responds to this signal and advances the film by one frame.

As successive frames on the film strip are exposed, the shutter 83 in FIG. 5, the film transport 82, and the frame counter 43 are operated. As the frame counter 43 is successively incremented, the registered count is displayed by the display device 90. After the tenth frame is exposed, the frame counter 43 provides an output signal which represents an end-carry signal to the column counter 44. The column counter 44 is incremented from the value of 1 to the value of 2. The display device 91 then registers the value of 02. The end-carry signal from the frame counter 43 is supplied to the delay circuit 96. The signal is delayed in the circuit 96 sufficiently long to permit the film transport 82 to complete its cycle of moving the exposed frame from behind the shutter 83. Thereafter the delayed signal in the circuit 96 is supplied through the Or circuit 97 to operate the film transport 82 again. It is pointed out that the shutter 83 is not operated in this instance. Thus the film transport 82 advances this frame without exposure. This completes the exposures of column 1 of fiche 1. Eventually the last frame of column 16 is exposed. When this event takes place, the counter 44 provides an end-carry output signal to the fiche counter 45. The fiche counter 45 then is incremented from the value of 1 to the value of 2. The display device 92 then displays the value of 2. It is pointed out that after the tenth frame of each column is exposed, the output signal from the frame counter 43 increments the column counter 44 and passes through the delay circuit 96 and the Or circuit 97 to advance the film transport 82 thereby to skip a frame. This takes place ten times in the process of completing the exposures of fiche 1. Each time the tenth frame of the sixteenth column is exposed, the column counter 44 increments the fiche counter 45. After the fiche counter 45 is incremented ten times, it provides an end-carry signal which sets the flip-flop 86 to the 1 state. The 0 output side of the flip-flop 86 then provides an output signal which deconditions or deactivates the And circuit 94, and no further recording operation may take place even if the record switch 23 is operated. The end film lamp 46 is illuminated by a signal from the 1 output side of the flip-flop 86 in FIG. 5. The end film lamp 46 is visible on the face of the camera 9 in FIG. 1. When this lamp is illuminated, it signifies that all fiches of the cartridge have been exposed. The operator then replaces the cartridge with another one, operates the latch 81 to perform a reset operation of the programmer 84, and the recording process may be continued with the new cartridge.

Thus a unique and novel camera arrangement is provided for optically recording information on the frames of a film strip which thereafter is converted to microfiches composed of photographic frames disposed in columns and rows. The camera is inexpensive to manufacture, maintain, and operate since the operator need not have any special skills. The only manual operations involved are the insertion of a cartridge, operating the latch 81 in FIG. 5 to reset the programmer, the placement of documents on the base 10 in FIG. 1, and the operation of the record switch 23 for each document. The programmer 84 in FIG. 5 may be constructed of electronic components or electromechanical components as desired.

While the invention has been particularly shown and described with reference to a preferred embodiment thereof, it will be understood by those skilled in the art that various changes in form and details may be made therein without departing from the spirit and scope of the invention.

What is claimed is:

1. A fiche camera arrangement for recording documents on photographic frames on a film strip which subsequently is converted to an array of photographic frames on a fiche, said camera including:
   a reel of strip film, transport means coupled to said reel of strip film for advancing the film,
   shutter means in said camera for exposing frames of film, record means coupled to said shutter, said record means being operated to actuate said shutter,
   fiche coordinate counting means coupled to said record means, said fiche coordinate counting means responding to operation of the record means to register the number of the next frame to be exposed in a fiche column, the number of the fiche column being exposed, and the number of the fiche being exposed in the reel of film, and
   visual display means coupled to the fiche coordinate counting means for visually displaying the number of the next frame, the current column and the current fiche registered in the fiche coordinate counting means.

2. The apparatus of claim 1 further including further means coupled between the fiche coordinate counting means and the transport mechanism, said further means being operated by said fiche coordinate counting means to operate the transport means to advance the film by one frame after each column of a fiche is exposed.

3. The apparatus of claim 1 wherein the fiche coordinate counting means includes first counting means responsive to the operation of the record means to register the number of the next frame to be exposed in a column of a fiche, second counting means coupled to the first counting means, said second counting means responding to the first counting means to register the number of the column being exposed in a fiche, and third counting means coupled to the second counting means, said third counting means responding to the second counting means to register the number of the fiche being exposed in a reel of film.

4. A fiche camera arrangement for recording documents on photographic frames of a film strip which subsequently is converted to an array of photographic frames disposed in columns and rows, said camera including:
   a reel of strip film, transport means coupled to said reel of film for advancing the film,
   shutter means for exposing frames of film, record means coupled to said shutter means, said record means being operated to actuate said shutter, and
   fiche coordinate counting and display means coupled to said record means, said fiche coordinate counting and display means including first counting and display means coupled to the record means to register and present visually the number of the next frame to be exposed in a column of a fiche, second counting and display means coupled to the first counting and display means, said second counting and display means responding to the first counting and display means to register and present visually the number of the column being exposed in a fiche, and third counting and display means coupled to the second counting and display means, said third counting and display means responding to the second counting and display means to register and present visually the number of the fiche being exposed in a reel of film.

5. The apparatus of claim 4 further including means coupled between the first counter and the transport means for operating the transport means to advance one frame of film between fiche columns.

* * * * *